INVENTORS
CLIFFORD M. RYERSON
JAMES T. BULL
ATTORNEYS

INVENTORS
CLIFFORD M. RYERSON
JAMES T. BULL
BY
ATTORNEYS

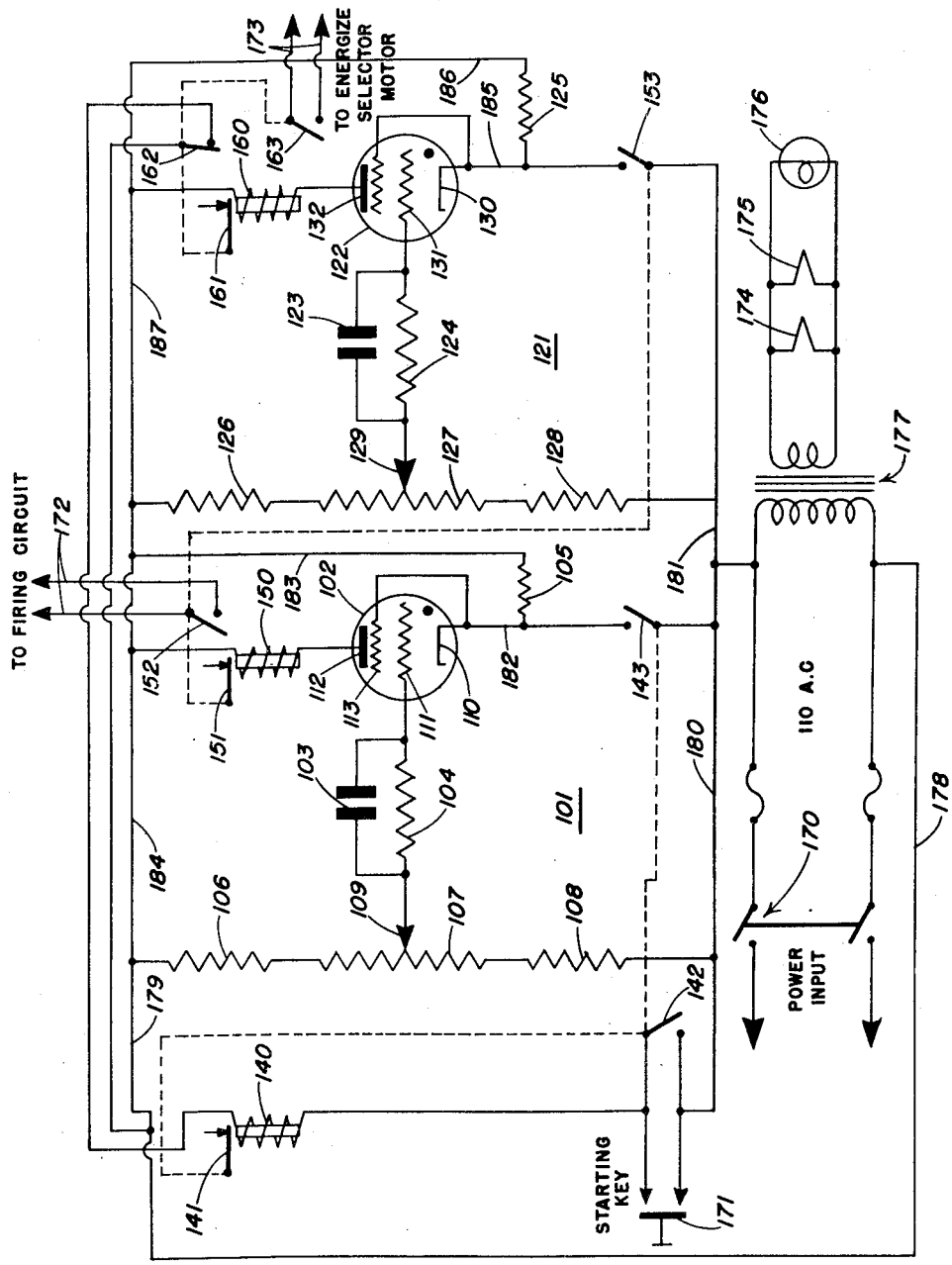

2,778,996

Patented Jan. 22, 1957

2,778,996

TRANSIENT PEAK VOLTMETER

Clifford M. Ryerson, Kinsale, and James T. Bull, Falls Church, Va.

Original application February 16, 1950, Serial No. 144,552, now Patent No. 2,736,192, dated February 28, 1956. Divided and this application April 11, 1952, Serial No. 281,880

3 Claims. (Cl. 324—102)

(Granted under Title 35, U. S. Code (1952), sec. 266)

The present invention relates to an apparatus for determining and recording the effect of a known variable upon an unknown variable changing as a function thereof, and more particularly relates to an apparatus for determining and recording the effect of spatial orientation from a condition producing source upon the peak values of the condition resulting therefrom. For example, it is desirable in the design of rockets and rocket launchers, particularly those designed for aircraft, as well as the aircraft structure itself, to have accurate information available concerning the characteristics of a rocket exhaust as it impinges on such structures, that is, the variations of such conditions as pressure and/or temperature produced by the blast or flash of a rocket with respect to various spatial orientations from the exhaust end thereof.

Prior to the present invention, this information was obtainable only by establishing recording pickups at predetermined stations spaced at various orientations from the rocket, and by observing and recording the changes in the conditions with respect to time at each of these stations. To obtain the necessary information involving the changes in such conditions with respect to distance or spatial orientation from the rocket, it was necessary to correlate the several records with respect to time and then to plot the separate readings to obtain the functions of said conditions with respect to spatial orientations. Such operations were laborious, time consuming, and inaccurate in final results. The present invention, however, is designed to pick up automatically the transient peak conditions resulting from a rocket blast or the like at various spatial orientations with respect thereto, to correlate these peak values with respect to spatial orientation from the blast or condition producing source, and to record the results thus obtained to give a trace or graph representing the effect of spatial orientation from the condition producing source upon the peak condition obtained therefrom.

It is therefore, one object of the present invention to provide an apparatus that analyzes the effect of a known variable upon a second variable.

Another object of this invention is to provide an apparatus that analyzes and records the effect of orientation with respect to a condition producing source, as a known variable, upon the peak values of a transient condition produced by said source, as a second variable, such transient condition being, for example, pressure or temperature.

Another object of the present invention is to provide an apparatus that analyzes and records the effect of spatial orientation from a condition producing source upon the peak values of a transient condition produced thereby for the duration of the excitation of the condition producing source, or for any desired predetermined portion thereof.

Another object of the present invention is to provide an apparatus that automatically analyzes and records the effects of spatial orientation from an explosion or blast upon the peak values of the transient conditions of temperature or pressure resulting therefrom during the duration of said explosion or blast, or for any desired predetermined portion thereof.

A further object of the present invention is to provide an apparatus which automatically initiates a condition producing source such as, for example, an explosion or rocket blast, produces a signal voltage proportional to the transient values of the condition being analyzed as determined at a plurality of desired spatial orientations therefrom, and correlates the various peak signal voltages thus produced with the respective spatial orientations from the condition producing source, thereby producing an analysis of the effect of spatial orientation upon the peak values of the condition being analyzed.

A still further object of the present invention is to provide a transient peak voltmeter which is responsive to exceedingly transient peak voltages and which can be made to store the peak voltage value obtained during a particular desired time interval.

Still another object of the present invention is to provide an electrical variable time delay circuit which operates to deliver a signal, close a circuit, or the like after a predetermined time interval from the initiation thereof, which time interval may be varied according to the settings imposed upon said circuit.

In general, the purpose of the herein described embodiment of the present invention is to determine the effect of a condition producing source at various spatial orientations therefrom, and more particularly is to analyze and record the effect of spatial orientation from a blast or explosion source upon the maximum temperature and pressure obtained therefrom. To this end there is provided a plurality of pickups designed to transmit a voltage proportional to either the temperature or pressure applied thereto. A transient peak voltmeter is associated with each pickup and designed to hold, for a period of time, the peak voltage fed thereto from its associated pickup. A multiple bank signal collector is provided: a first bank thereof is designed to collect the peak voltages obtained by the peak voltmeters plus a predetermined voltage placed in electrical series with the output of each voltmeter, this predetermined voltage being proportional to the spatial displacement of the particular associated pickup from the explosion or blast source along one axis; and a second bank of said collector is designed to collect voltages from predetermined voltage sources, these sources producing voltages proportional to the spatial displacements of the several pickups from the condition producing source along another axis. A suitable correlating and recording means are also provided, such as a cathode ray tube and a camera associated therewith. In which case one pair of beam deflecting plates of the cathode ray tube are connected to receive successively the voltages collected by the first bank of the collector, while the other pair of beam deflecting plates are connected to receive successively the voltages collected by the second bank of the collector, corresponding pairs of voltages from the two banks relating to the same pickup being simultaneously applied to their respective plates and such pairs being successively thus applied.

Thus, with the several pickups arranged in a desired spatial pattern with respect to the blast or explosion source, the transient peak conditions of temperature or pressure, depending upon the type of pickup used, resulting from the blast or explosion at the chosen spatial orientations of the various pickups therefrom are obtained. The transient peak conditions of temperature or pressure at each of the several pickups are transposed thereby into transient peak voltages, portional to said conditions, and are fed to the corresponding peak voltmeters where they are temporarily stored. After each pickup has been exposed to the peak condition being determined, the transient peak voltages thereby stored in the various peak voltmeters together with the predetermined potentials in series therewith are successively applied to one pair of beam deflecting plates of the cathode ray tube. By means of the second bank of said collector and the predetermined voltages associated therewith, successive corresponding fixed potentials are synchronously applied to the other pair of beam deflecting plates of the cathode ray tube in synchronism with the application of the peak voltages. In this manner, a trace is obtained on the cathode ray tube screen representing the effect of spatial orientation from the condition producing source upon the peak condition obtained, and a photographic record thereof may be made by use of a suitable camera.

A fuller understanding of the present invention and of its objects and advantages will be had by a consideration of the following detailed description made in conjunction with the accompanying drawings in which like numerals refer to like or corresponding parts, and wherein:

Fig. 3 is a wiring diagram of the timer circuit employed in the present analyzing and recording apparatus.

Figure 1:
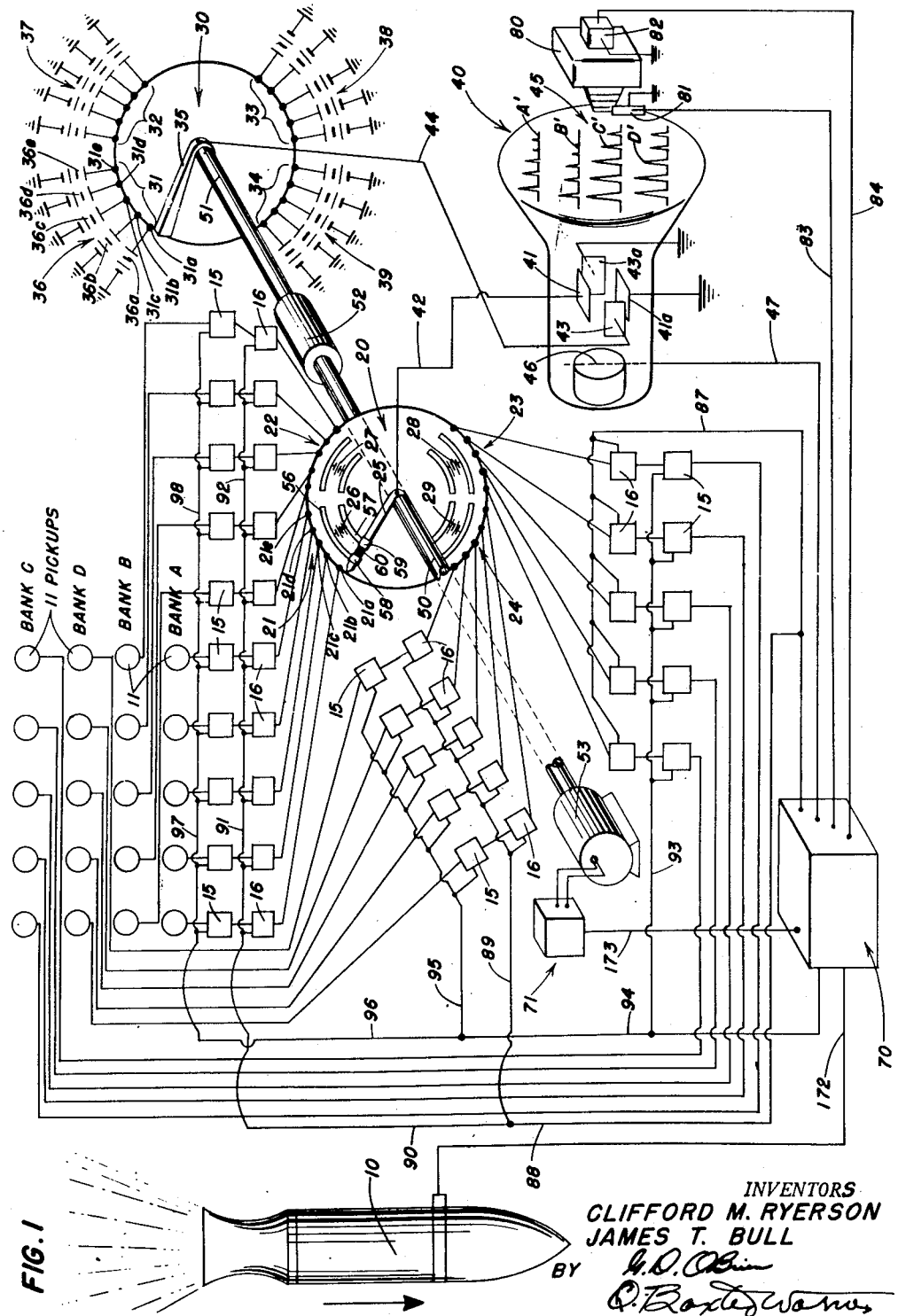
Fig. 1 is a diagrammatic view of the present analyzing and recording apparatus employing for the purpose of illustration 20 condition responsive pickups.

Referring to Fig. 1, a plurality of pickups 11 are shown arranged at various spatial orientations from the exhaust end of a rocket 10. These pickups are instruments designed to produce a voltage proportional to a condition, such as temperature or pressure, to which it is exposed. Such temperature sensitive or pressure sensitive pickups are conventional and well known in the art, and one such type of pickup sensitive to temperature variations comprises an impedance bridge wherein the sensitive element is formed of a thermo-resistor, the voltage output of the bridge being proportional to the temperature of the sensitive element, while a pressure sensitive type might comprise a pressure responsive bellows operating upon a voltage divider, the voltage output of the divider being proportional to the pressure applied to the bellows. In the specific embodiment shown in Fig. 1, the pickups are arranged in four banks, bank A, bank B, bank C, and bank D, each placed at an equal distance from the longitudinal axis of the rocket 10 and stepped from each other therealong by equal increments, while the five pickups comprising each bank are stepped away from the longitudinal axis of the rocket by equal increments. However, the relative positions of the banks and the relative positions of the various pickups comprising each bank may be chosen to obtain any desired pattern of spatial orientation from the exhaust end of the rocket.

Each pickup 11 has a transmitting channel comprising a preamplifier 15, a peak voltmeter 16, and a lead connecting the peak voltmeter to a contact point on the signal collector face 20 of a ganged multiple face rotary switch. Considering bank A in particular, the pickups 11 composing this bank produce voltages proportional to the condition under determination, such as temperature or pressure, to which they are each exposed and feed the voltages thus produced to preamplifiers 15, from which the amplified voltages are fed to the peak voltmeters 16. In the performance of a determination, the rocket 10 is fired, and the amplified peak voltages produced by pickups 11 during the determination, in response to the peak values of the condition being measured at the various positions are stored in the peak voltmeters 16 and applied to the contacts 21a, 21b, 21c, 21d, and 21e of the face 20 of the ganged multiple switch. Thus each contact of the group 21 carries the amplified peak voltage of its corresponding pickup 11 in bank A, this voltage being proportional to the peak condition value obtained at the pickup's position. Banks B, C, and D operate similarly, each pickup 11 thereof having a transmitting channel to its corresponding contact on face 20, the group of contacts 22 being associated with bank B, the group 23 with bank C, and the group 24 with bank D.

Figure 2:
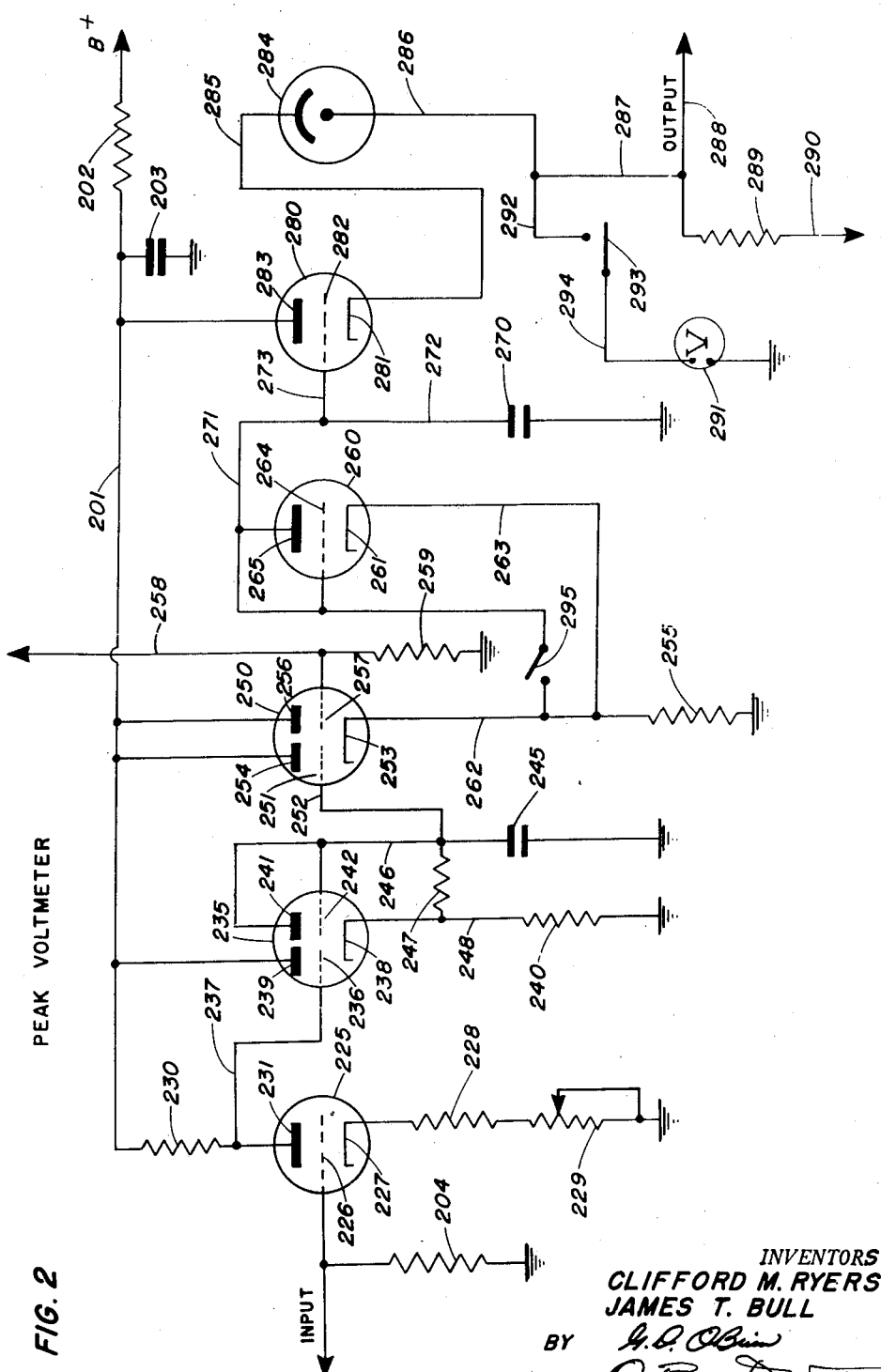
Fig. 2 is a wiring diagram of the transient peak voltmeter which is employed in the present analyzing and recording apparatus.

The preamplifiers 15 are conventional units operating merely to amplify the relatively small voltage outputs of the pickups 11. The peak voltmeters 16, however, are novel circuits designed to hold and to indicate the amplified transient peak voltages produced by the associated pickups 11 and delivered by the preamplifiers 15 as a result of the transient peak of the condition under determination. The novel peak voltmeter circuit is shown in Fig. 2 and is described in detail below.

As mentioned above, the peak voltages carried by the various peak voltmeters 16 are applied to the corresponding contacts on the signal collector face 20 of the ganged multiple face rotary switch. This switch comprises the two collector faces 20 and 30, each having a contact wiper arm associated therewith designated by the numerals 25 and 35, respectively. The wipers 25 and 35 are correspondingly placed with respect to their associated switch faces, are ganged together for simultaneous movement by means of the shafts 50 and 51 as united by the coupling 52, and are impelled in their movement across their respective faces by means of the motor 53. Wiper arm 25 is electrically connected by means of lead 42 to the vertical beam deflecting plate 41 of the cathode ray tube 40, while wiper arm 35 is electrically connected to the horizontal beam deflecting plate 43 by means of lead 44; the opposite beam deflecting plates 41a and 43a are both grounded.

Thus, with the pickups 11 arranged in the desired spatial pattern with respect to the rocket 10, the rocket is fired. During the blast, the various transient voltages produced by the pickups 11 are amplified and fed to the respective peak voltmeters where the transient peak voltages thus obtained are stored and applied to the contacts on face 20. After completion of the blast, the motor 53 is initiated to drive the wipers 25 and 35 one revolution about their respective faces 20 and 30 enabling wiper 25 to successively engage the various contacts on face 20 and thereby successively applying the peak voltages carried by each of the peak voltmeters to the vertical beam deflecting plate 41 of the cathode ray tube 40.

Simultaneously with the traversing of collector face 20 by wiper 25, wiper 35 traverses the collector face 30 of the ganged multiple face switch, which is provided with a plurality of contacts generally indicated by the groups 31, 32, 33, and 34 arranged similarly to those on face 20. Each of these contacts carries a predetermined potential as established by the potential sources generally indicated by the groups 36, 37, 38, and 39. The position of wiper 25 is so synchronized with that of wiper 35 on their respective faces, that wiper 35 simultaneously engages the contact point on face 30 corresponding to that engaged by wiper 25 on face 20, contacts 31a, 31b, 31c, 31d, and 31e on face 30 corresponding to contacts 21a, 21b, 21c, 21d, and 21e respectively on face 20, and the contact groups 32, 33, and 34 on face 30 similarly corresponding to contact groups 22, 23, and 24 respectively on face 20. Thus, for example, as wiper 25 engages contact 21a on face 20, wiper 35 engages the contact 31a on face 30, so that as the amplified peak voltage obtained from the pickup feeding to the contact 21a is applied to the plate 41 causing a vertical displacement of the cathode ray tube beam, wiper 35 impresses the voltage from the fixed potential source 36a upon the horizontal deflecting plate 43 causing a determined horizontal displacement of the cathode ray tube beam simultaneously with the vertical displacement. As the wipers 25 and 35 continue to traverse the faces 20 and 30 respectively, wiper 25 breaks from contact 21a and engages contact 21b, whereupon the voltage of this channel causes a second vertical displacement of the cathode ray tube beam, and simultaneously therewith, the wiper 35 engages contact 31b causing a second horizontal displacement of the cathode ray tube beam in accordance with the fixed potential of source 36b. Thus, as the wipers 25 and 35 traverse the contacts on the faces 20 and 30 of the multiple face switch, successive horizontal and vertical displacements of the cathode ray tube beam cause a trace upon the cathode ray tube screen 45. The predetermined potentials applied to the horizontal deflecting plate 43 of the cathode ray tube are generally made proportional to the spatial displacement of their corresponding pickups along one axis from the impulse producing source, and more particularly, the potential of each fixed source comprising a group of potential sources, such as the group comprising the sources 36a, 36b, 36c, 36d, and 36e bear a relationship to each other proportional to the stepped spatial displacements from the longitudinal axis of the rocket 10 of the group of pickups comprising the corresponding bank, bank A. Thus the ratio of the fixed potentials of the group above enumerated corresponds to the ratio of the spatial displacements from the longitudinal axis of the rocket 10 of the pickups comprising bank A; likewise, the ratio of the fixed potentials comprising group 37 similarly correspond to the ratio of spatial displacements from the longitudinal axis of the rocket 10 of the pickups comprising bank B. The groups of potentials 38 and 39 bear a similar relationship to the pickups comprising bank C and bank D respectively. Thus, with the arrangement of pickups here shown, the trace produced on the cathode ray tube screen 45 represents, in its vertical displacements, the transient peaks of the condition being determined, while each horizontal displacement represents the spatial displacement from the longitudinal axis of the rocket 10 of the particular pickup whose voltage is then causing the particular vertical displacement. In order to obtain a continuous horizontal displacement of the cathode ray tube beam, rather than an intermittent displacement with the beam returning to zero position after each engagement of wiper 35 with a contact on face 30, wiper 35 is made to bridge any two successive contacts in a group; i. e., before wiper 35 breaks with one contact point, it engages the succeeding contact in that group, thereby producing a continually progressing horizontal displacement of the cathode ray tube beam for any particular group of contacts.

Face 20 of the ganged multiple face switch is further provided with the two wipers 56 and 57 which have impressed across them a determined potential from source 26. In addition, wiper 25 is divided into two conducting portions 58 and 59 by means of the insulating or electrical nonconducting portion 60, with portions 58 and 59 designed to traverse the wipers 56 and 57, respectively. In this manner, a constant and predetermined potential from source 26 is superimposed upon the peak voltages applied to the contacts 21a, 21b, 21c, 21d, and 21e by their respective peak voltmeters as wiper 25 engages said various contacts. The combined voltages, that is, the peak voltages applied to the various contacts and the predetermined potential superimposed thereon by the above-described means, are applied to the vertical plate 41 of the cathode ray tube 40. The group of contacts 22, 23, and 24 on face 20 of the ganged multiple switch are supplied with a similar arrangement whereby the predetermined potentials from sources 27, 28, and 29 are impressed upon the peak voltages of these groups, respectively. The fixed potential sources 26, 27, 28, and 29 may vary in potential values from each other in correspondence with the spatial displacements of the various banks from each other along the longitudinal axis of the rocket. Thus, in applying the various peak voltages derived from the several pickups to the vertical deflecting plate 41 of the cathode ray tube, the values obtained from each bank of pickups are vertically displaced from each other on the cathode ray tube screen an amount which may be proportional to the displacement of the banks from each other by obtaining a proper ratio of voltages for the potential sources 26, 27, 28, and 29. A separate trace for each bank of pickups is thereby obtained on the cathode ray tube screen as indicated by the traces A', B', C', and D', the peaks of these traces representing the amplified peak voltages derived from the various pickups 11, the horizontal displacements between the peaks, caused by the predetermined potentials associated with face 30 of the ganged multiple face switch, representing the spatial displacements of the pickups from the longitudinal axis of the rocket, and the vertical displacements between traces, caused by the predetermined potentials associated with face 20 of the ganged multiple face switch, representing the spatial displacements of the several banks with respect to each other along the longitudinal axis of the rocket, thereby indicating the effect of spatial orientation about the blast source upon the peak value of the condition being analyzed.

It is apparent that the operation of motor 53, which causes wipers 25 and 35 to traverse their respective faces, should not be initiated until the rocket 10 is completely fired, for otherwise the peak voltage readings are likely to be premature and in error. To effectuate this time relationship or time control, the timer indicated generally by numeral 70 in Fig. 1 is designed to delay the initiation of the motor 53, through its control circuit 71, until a predetermined time after initiation of the firing of the rocket 10. The motor control circuit, representatively designated by numeral 71, is a conventional relay circuit or the like operating to simultaneously control a conventional motor clutch and brake arrangement, not shown. Upon initiation thereof by the timer circuit, whose operation will be discussed in detail below, the control circuit 71 operates to engage the motor clutch and release the brake, thereby enabling the motor 53 to drive the shafts 50 and 51; but upon completion of one revolution of these shafts, the control circuit operates to release the clutch and apply the brake, thereby stopping the rotation thereof. Thus, energization of the motor control circuit 71 by the timer circuit 70, causes the shafts 50 and 51 to make one complete revolution and then to stop, the two wipers being driven thereby making one complete traverse of their respective switch faces.

Although the signal collector is herein described and shown as a commutator type for the purposes of illustration, with the faces 20 and 30 comprising two banks of the collector, it is to be noted that other types of signal collectors may be readily substituted therefor, such as electronic collectors, as will be readily apparent to those skilled in the art. It is, therefor, not intended to limit the scope of the present invention to this particular type of collector.

A portion of the circuit of the timer 70, sufficient to illustrate its operation, is shown in detail in Fig. 3, wherein electronic time delay circuits 101 and 121 are depicted along with a plurality of relays functioning to operate a firing circuit switch 152 and the motor energizing switch 153 in timed relationship. With the timer master switch 170 closed, momentary closing of starting key 171 energizes the A. C. relay 140 to move the arm 141 thereof from its normally open position, toward the relay core. Arm 141 is ganged with, or otherwise controls, normally open switch arms 142 and 143, thus causing them to close. Closure of switch 142 provides a holding circuit to keep relay 140 energized after starting key 171 is released, while closure of switch 143 initiates the operation of time delay circuit 101, comprising the gas filled discharge tube 102, condenser 103, resistor 104 shunted across said condenser, and the various resistors 105, 106, 107, and 108, the latter three functioning in conjunction with the variable tap 109 as a voltage divider. A. C. relay 150 is energized after the desired lapse of time, as determined by the values used for the various elements comprising this time delay circuit and the position of the variable tap 109 on the resistor 107. Arm 151 is ganged with, or otherwise controls, switches 152 and 153, so that movement of arm 151 from its normally open position as shown in the drawing, as caused by energization of relay 150, causes normally open switches 152 and 153 to close. Closure of switch 152 completes the firing circuit to the rocket and initiates the rocket blast through leads 172, while closure of switch 153 initiates the second time delay circuit 121, likewise comprising the gas filled discharge tube 122, condenser 123, resistor 124 shunted across said condenser, and the various resistors 125, 126, 127, and 128, the latter three operating in conjunction with the variable tap 129 as a voltage divider. After the desired time interval, as determined by the values used for the various elements comprising this circuit and the position of the variable tap 129 on the resistor 127, relay 160 is energized causing a movement of arm 161 from its normally open position as shown in the drawing, which is in turn ganged with, or otherwise controls, the switches 162 and 163. Movement of arm 161 causes switch 163 to close and thus to trip the motor energizing circuit through lead 173, while causing switch 162 to open and thus to break the energizing circuit to relay 140. Deenergization of relay 140 causes the arm 141 to return to its normally open position opening switches 142 and 143, thus deenergizing relay 150 and enabling arm 151 to return to its original position opening switches 152 and 153, in turn resulting in deenergization of relay 160, causing arm 161 to return to its normally open position and opening switch 163 and closing switch 162. This circuit is thus returned to deenergized state and in readiness for a subsequent run. Thus, after a suitable time delay from the closure of key 171, the rocket 10 is fired, and preferably after a time sufficient for the rocket to completely fire itself, the motor 53 is energized to cause the wipers 25 and 35 to traverse their respective switch faces 20 and 30, transmitting the various amplified peak voltages produced by the pickups 11 and the independently produced potentials associated with each face to the cathode ray tube 40, and causing a representative trace thereof to be made upon the cathode ray tube screen 45 as described hereinabove. The motor 53 is further provided with any suitable and conventional clutch and brake system so as to cause the shafts 50 and 51 to make one complete revolution of 360 degrees and then to stop at the zero point indicated in Fig. 1, as described above.

Considering the operation of this time delay circuit in detail, immediately upon closure of switch 170 the heater filaments 174 and 175 for the tubes 102 and 122 and the pilot light 176 are energized through the transformer 177, placing the circuit in readiness for operation. Before starting key 171 is closed, switches 143 and 153 are open, and current is flowing through leads 178 and 179, both voltage dividers, and leads 180 and 181. At this time the tubes 102 and 122 operate as rectifiers as between their cathodes 110 and 130 and their grids 111 and 131 respectively, for cathode 110 is connected through leads 182, resistor 105, and leads 183 and 184 to one end of the voltage divider comprising resistors 106, 107, and 108, while cathode 130 is connected through lead 185, resistor 125, and leads 186 and 187 to one end of the voltage divider comprising resistors 126, 127, and 128, and since the grids 111 and 131 are connected to the intermediate taps 109 and 129 of their respective voltage dividers, the potentials of the cathodes are more negative than that on the grids on one half of each current cycle, thus causing the condensers 103 and 123 to become charged to these respective potential differences. It is apparent, therefore, that the maximum charges carried by the condensers 103 and 123 depend upon the settings of taps 109 and 129 on their respective voltage dividers. During this condenser charging period, the plates 112 and 132 are at the same potentials as their respective cathodes 110 and 130, making the tubes 102 and 122 nonconductive therebetween.

When starting key 171 is closed, switch 143 is closed by the action of relay 140, as described above, thus placing the cathode 110 at a potential sufficiently positive with respect to grid 111, due to the connection thus afforded between the positive side of condenser 103 and said cathode, to prevent the flow of electrons therebetween and to the condenser 103. A time interval, as determined by the relative values of condenser 103 and its associated resistor 104 and the setting of tap 109 which determines the charge on the condenser, is required for the condenser to discharge itself sufficiently to permit further operation of tube 102. After the condenser has discharged sufficiently so that the bias on grid 111 has reached the operating value of the tube in conjunction with the shielding grid 113, the tube becomes conductive from the cathode to the plate to energize the A. C. relay 150.

As indicated above, energization of relay 150 causes switches 152 and 153 to close through the operation of arm 151 and connecting linkages. In this manner the firing circuit is closed and the second time delay circuit 121 is initiated. This latter circuit operates in the same manner as the former to energize relay 160 after a suitable time delay as determined by the values of the condenser 123 and the resistor 124 and the setting of tap 129, thereby closing switch 163 to energize the ganged multiple face switch motor control circuit 71 and opening switch 162 to deenergize the present circuit. Thus, by closure of starting key 171 the rocket is fired and the motor 53 is energized at suitable time intervals. The various values for the several elements comprising this circuit and the types of tubes employed as indicated in Fig. 3 represent one specific operational combination thereof.

Although here described as effecting two desired time intervals, by increasing the number of time delay circuits and interrelating their initiation in the manner here indicated as between circuits 101 and 121, any desired number of various time interval delays may be obtained, the interval obtained being determined by the values of the condenser and resistor associated therewith and the setting of the tap on the voltage divider.

The present invention is further designed to produce a photographic record of the peak condition versus spatial orientation characteristics of the rocket blast. To this end a camera 80 is suitably positioned with respect to the cathode ray tube screen 45 to obtain a photographic record of the above-described traces produced thereon, and this camera is further supplied with automatic means for controlling the shutter operation and for changing the film. Thus, after firing of the rocket and simultaneously with the initiation of the motor 53, the camera shutter is opened by means of a solenoid 81, or the like, and is maintained open until the motor is deenergized, whereupon the shutter is closed. Upon closure of the shutter a film changing mechanism indicated by the numeral 82 is energized to change the film and thus place the camera in readiness for the next run. In the preferred embodiment of the present invention, these operations may be accomplished in the desired time sequence by including in the time delay circuit means for accomplishing this timed relationship of operation, although any other desired means, such as employing commutators and wipers therefor on the rotary switch, as will be apparent to those skilled in the art, may be used. Connections between the timer 70 and the shutter operating solenoid 81 and the film changing mechanism 82 are indicated by the leads 83 and 84, respectively. In addition, a suitable time control of the screen grid 46 of the cathode ray tube may be effected by including in the time control circuit of the timer 70 means for controlling the bias on the grid to permit the beam of electrons to impinge on the screen 45 during operation of the motor 53 and to screen the beam while the motor is inoperative, connection between the timer and grid being made by lead 47.

Also, to obtain the desired transient peak voltages from the pickups 11, it is necessary that the operating current for the peak voltmeters 16 be fed thereto from prior to the initial firing of the rocket and until wiper 25 has completely traversed the face 20 of the ganged multiple switch, and this may likewise be obtained by including a suitable time delay circuit in the series of such circuits contained in the timer 70, connections therebetween being indicated by the leads 87, 88, 89, 90, 91, and 92. To obtain the desired amplification of the pickup signals the preamplifiers 15 must also receive their operating current from prior to the initial firing of the rocket and for the duration thereof. To this end a similar arrangement may be included in the timer 70, and connection therebetween be effected by leads 93, 94, 95, 96, 97, and 98. Thus, each of the various stages of operation of the present invention may be automatically accomplished in a suitable time sequence following the closure of the starting key 171 to initiate a plurality of time delay circuits similar to those described above.

However, if desired other means may be employed to obtain the desired sequence.

In operation, upon closure of the starting key 171 the peak voltmeters and preamplifiers are initiated and the rocket is then fired. After a predetermined time interval from the firing thereof, the motor is automatically initiated, the cathode ray tube screen grid 46 is biased to permit the electron beam to impinge on the screen, and the camera shutter is opened, causing the various peak voltages obtained by the peak voltmeters to be traced on the cathode ray tube screen 45 and the trace thus produced to be photographically recorded. After one complete revolution of the motor, it is deenergized, the shutter of the camera is closed, the screen grid is biased to block the electron beam of the cathode ray tube, the preamplifiers and peak voltmeters are deenergized, and a new film is substituted for the old film bearing the record of the present run, thus putting the apparatus in readiness for the next run.

As discussed above, the peak voltages produced by the pickups 11 are fed to the respective preamplifiers 15 and thence to peak voltmeters 16. These voltmeters are so designed as to hold the peak voltages applied thereto for a period of time and apply the same to the contact points on the collector face 20 of the ganged switch, thereby enabling the wiper 25 to successively apply these peak voltages to the plate 41 of the cathode ray tube 40. The peak conditions of temperature and pressure produced by a blast, such as occurs on the ignition of a rocket fuel charge, are very likely to be particularly transient in nature. It is therefore necessary that a peak voltmeter be used in conjunction with the present apparatus which is capable of picking up and holding the resultant equally transient voltage values delivered by the pickups 11 and amplified by the preamplifiers 15.

The electrical circuit for a peak voltmeter sufficiently sensitive and responsive for the purpose is shown in Fig. 2, and comprises a low capacity high sensitivity signal receiving circuit, a high capacity, low sensitivity signal storing circuit, and a signal delivery system. The signal receiving circuit includes a signal amplifier, a cathode follower, a relatively low capacity condenser for temporarily storing the peak signal values fed to the cathode follower, and a one-way valve or rectifier for impressing said signals upon said condenser. The signal storing circuit includes a cathode follower, a one-way valve or rectifier, and a relatively high capacity condenser, said cathode follower and one-way valve or rectifier operating to impress the voltages received by said low capacity condenser upon said high capacity condenser to be there stored. The signal delivery circuit includes a cathode follower cooperating with a voltage regulator tube for filtering out the operating voltage of the present peak voltmeter and applying the peak signal voltage stored in the storage condenser to a direct reading voltmeter and to the output terminal.

The operating voltage for the present peak voltmeter is fed to the various parts of the circuit by means of the B+ lead 201 through the filter comprising the resistor 202 and the condenser 203, while the input signal voltage, or the voltage produced in response to the condition being measured as established by the pickups 11 and amplified by the preamplifiers 15, is applied to the peak voltmeter across the grid 226 and cathode 227 of tube 225 through the high input impedance 204. Thus, the positive input signal voltage is applied to the grid 226 of the voltage amplifier triode 225, having the self biasing resistors 228 and 299 and the plate load resistor 230. The application of the positive signal voltage to the grid 226 operates to decrease the internal resistance of the vacuum tube 225, thereby causing the cathode 227 to become more positive and the anode 231 to become more negative than existed in the zero signal state of the circuit before application of an input voltage thereto. The plate voltage of this amplifier tube, or the thus amplified signal voltage, is applied to the grid 236 of the duotriode 235 by means of lead 237, and this grid is thus caused to become more negative, thereby causing an increase in the internal resistance of vacuum tube 235, as between the cathode 238 and the anode 239. This tube is associated with the cathode load resistor 240, thus enabling the above-mentioned portion thereof to act as a cathode follower. The cathode 238 is thus caused to become more negative, which results in charging the condenser 245 by the increased flow of electrons from the cathode 238 to the anode 241. The latter triode portion of tube 235, comprising the cathode 238, grid 242, and plate 241, is connected as a diode and operates as a one-way valve or rectifier. Because of the unidirectional flow of current permitted by this portion of the tube, the amplified signal voltage thus impressed upon the condenser 245 through the lead 246 is there temporarily held. The above-described portion of the peak voltmeter circuit represents the first phase thereof, being what is above termed the signal receiving circuit. Condenser 245 has a relatively small capacitance of preferably about .01 microfarad, thus being readily responsive to even exceedingly transient input voltages applied across to the grid and cathode of tube 225.

The resistor 247, connected across the condenser 245 through lead 248 and the resistor 240 to ground, is very large, being preferably about 22 megohms, and may therefore be considered for the operational purposes of the present circuit to be an infinite resistance. Its only purpose is to permit a slow discharge of the condenser 245 to stabilized or zero signal state upon the completion of the test. However, since the condenser 245 is merely the peak signal receiving condenser, the purpose of which is to enable the use of a relatively small capacitance for the purpose of picking up exceedingly transient signals which would be missed by a relatively large capacitance, which immediately operates to transmit the signals impressed thereon to the signal storage circuit, the slow leak therefrom through the resistor 247 is immaterial to the operation of the circuit.

The negative amplified signal voltage thus impressed upon the condenser 245 is applied to the grid 251 of the duotriode 250 by means of lead 252, causing an increase in the internal resistance of said vacuum tube, as between its cathode 253 and anode 254, and since this tube is associated with the cathode load resistor 255, this portion thereof functions as a cathode follower, thereby resulting in a corresponding increase in the negative potential of the cathode 253. This increased negative potential is impressed upon the cathode 261 of the tube 260 by means of leads 262 and 263, which tube comprises the cathode 261, grid 264, and plate 265, connected as a diode, and functions as a one-way valve or rectifier, causing a flow of electrons from the cathode to the anode thereof in response to the amplified signal voltage as received by condenser 245 to charge the condenser 270 through leads 271 and 272. The condenser 270 is the storage condenser and has a relatively large capacitance, preferably about 0.5 microfarad. The voltage thus impressed upon said condenser is there held and stored for a period of time because of the unidirectional flow of current permitted by the rectifier tube 260.

The impressed potential on the condenser 270 is applied by leads 272 and 273 to the grid of the triode 280, comprising the cathode 281, grid 282, and plate 283. Triode 280, which operates as a cathode follower, has its plate at B+ voltage while its cathode is connected to the voltage regulator tube 284 through lead 285 to deliver an output voltage through leads 286, 287, and 288 equal to the input signal. In order to obtain the desired output it is necessary to provide a means for removing the amplification factor from the voltage impressed on the cathode 281. To this end, a B— operating potential is impressed on the voltage regulator tube 284 through the resistor 289 and leads 290, 287, and 286. The value of the resistor 289 and the type of voltage regulator tube used are so chosen as to exactly balance the amplification factor and to permit the peak signal input voltage stored in condenser 270 to be carried by the output lead 288, thus enabling the amplified signals fed from a preamplifier 15 to the present peak voltmeter, which is the input signal thereof, to be applied to the desired contacts on face 20 of the ganged switch. In addition, a direct reading voltmeter 291 is included in the present output circuit through lead 292, switch 293, and lead 294, enabling the output voltage to be read directly therefrom by closure of switch 293.

Thus, upon the application of a varying signal voltage across the input impedance of the present peak voltmeter circuit, it is amplified and the amplified signal is continuously impressed on the receiving condenser 245, where each amplified signal increase over the voltage there carried at any instant is impressed thereon and is momentarily held thereby. The varying signals thus momentarily carried by the receiving condenser are transmitted therefrom to the storage condenser 270 which holds each increase in voltage fed thereto and thus carries the actual amplied transient peak voltage obtained during the entire operation. Upon the completion of an operation, the transient peak signal input voltage obtained may be tapped from the delivery circuit by means of the output lead 288, or may be read directly from the voltmeter 291.

In order to return the present peak voltmeter to stabilized state upon the completion of a test, the circuit is provided with a switch 295. Closure of this switch enables the condenser 270 and tubes 260 and 280 to return to stabilized or zero signal state by grounding the condenser, the grid of tube 280, and the plate and grid of tube 260. The signal receiving condenser 245 and the grid 251 of tube 250 automatically return to normal or stabilized state upon the completion of the test by leakage through the resistor 247 to ground. When the present voltmeter is used in the present condition versus spatial orientation analyzing and recording apparatus, switch 295 may be controlled either manually or automatically. The automatic control thereof may be effectuated in any desired manner such as, for example, employing a suitable additional time delay circuit in the timer 70 to open the switch on closure of the timer starting key 171 and to hold it open during the sweep of the wiper across the various contacts on the face 20, and to close it upon completion of this sweep.

In the type of test in which the present instrument is intended to be employed, there may be two or more peaks in the condition being determined during the run, and it may be desired to determine a lesser peak. The present circuit is designed with means which may be employed to measure the desired peak. To this end, the portion of the duotriode 250 comprising the plate 256 and grid 257 operates in conjunction with a grid biasing supply, lead 258, and resistor 259 to control the voltage transmission from the receiving to the storing circuit. By a suitable bias on the grid 257 the internal resistance of the tube 250, as between the cathode 253 and plate 256, may be maintained so low as to prevent an increase of potential of the cathode 253 above the normal operating potential thereof, as would normally occur in response to the increased potential of the condenser 245 as caused by an input signal. A suitable time control of this grid bias, which may be obtained, for example, by means of a suitable additional time delay circuit in timer 70, and which would operate in timed relationship to the initiation of the firing circuit, would enable the potential on cathode 253 to follow the grid 251 only during a predetermined portion of the rocket blast or operational run, thus impressing on condenser 270 the peak voltage obtained only during the existence of a desired peak value.

In the operation of the present transient peak voltmeter, the circuit is first zeroed by applying the B+ and B— potentials thereto and adjusting the variable biasing resistor 229 of the amplifier tube 225 until, with zero input voltage, the direct reading voltmeter indicates zero output. The timing means for the biasing supply to grid 257 of tube 250 is then adjusted for the desired time interval in which the peak voltage determination is sought. The circuit is now ready for operation, and during the determined time interval the peak input voltage applied to the amplifier tube grid 226 is amplified and the resultant value stored in the storing condenser 270, from which the transient peak input voltage obtained may be determined through the output delivery circuit. The various values for the several elements comprising this circuit and the types of tubes employed, indicated in Fig. 2, represent one specific operational combination thereof.

Considering the operation of this entire condition versus spatial orientation analyzing and recording apparatus, the pickups 11 are spatially arranged about the rocket 10 in any desired pattern. With the shafts 50 and 51 in zero position, the operating currents for the preamplifiers and peak voltmeters are applied thereto, and the rocket blast or other condition producing source is initiated. In a suitable time interval thereafter the motor 53 is initiated, the screen grid of the cathode ray tube 40 is biased to enable the electron beam to impinge upon the screen 45, and the shutter of the camera 80 is opened. As the wipers 25 and 35 are caused to traverse their respective switch faces, a trace of the peak voltages obtained from each bank of pickups is thus made on the cathode ray tube screen 45 and recorded by the camera 80. Upon completion of the sweep of each of the wipers 25 and 35 across their respective switch faces, the motor 53 is deenergized and braked at its zero position. Upon completion of the traverse of the wipers, the camera shutter is closed, and the film changing mechanism of the camera is energized to change the film, thus putting the recording camera in readiness for the next run. If desired, the entire sequence of the above operations may be automatically accomplished by the energization of a timer circuit containing a plurality of time delay circuits as hereinabove described and shown in Fig. 3. When such a timer is employed in conjunction with the present apparatus, the entire sequence of operations may be automatically accomplished by closure of the timer starting key 171.

It is not intended to limit the present invention to the specific embodiment herein disclosed, but modifications within the spirit and scope thereof as defined by the appended claims will be apparent to those skilled in the art.

This is a division of co-pending application of Clifford M. Ryerson and James T. Bull Serial Number 144,552, filed February 16, 1950, now Patent No. 2,736,192, issued February 28, 1956, for Condition Analyzing and Recording Apparatus, which application in turn discloses subject matter carried over from an earlier related application of Clifford M. Ryerson, Milton H. Aronson and Louis W. Erath, Serial No. 594,134, filed May 16, 1945, and copending therewith; the said related application Serial No. 594,134 having matured as Patent No. 2,547,978 on April 10, 1951.

The invention described herein may be manufactured and used by or for the Government of the United States of America for governmental purposes without the payment of any royalties thereon or therefor.

What is claimed is:

1. A peak voltmeter comprising an input signal amplifier for receiving a signal voltage, a cathode follower responsive to variations in the output thereof, a one-way valve or rectifier and a signal receiving condenser connected in series to form a rectifier-condenser pair, voltage output means from said cathode follower being connected across said rectifier-condenser pair, said cathode follower and amplifier cooperating to vary the potential across said rectifier in response to input signals to charge said condenser in accordance with increases therein, a second cathode follower responsive to the voltage thus impressed on said condenser, the input of said second cathode follower being connected across said condenser, a second rectifier and a storage condenser connected in series to form a second rectifier-condenser pair, voltage output means from said cathode follower connected across said second rectifier-condenser pair, said second cathode follower varying the potential across said second rectifier in response to the voltages impressed on said receiving condenser to charge said storage condenser in accordance with increases therein, voltage output being taken across said storage condenser, an output terminal for delivering the input signal peak as a steady voltage, a voltage regulator tube connecting said storage condenser to said output terminal, a source of negative voltage, and a resistor connecting said source to said output terminal, the type of voltage regulator tube and the value of said resistor being selected to exactly balance the amplification factor of said signal amplifier and reproduce the peak amplitude of the signal voltage.

2. A transient peak voltmeter comprising, an input signal amplifier, a first condenser and a first diode connecting the signal amplifier to the first condenser, the first condenser and diode forming a rectifier-condenser pair, voltage input to the rectifier-condenser pair being connected across the rectifier and condenser in series, a cathode follower connected to said first condenser, output voltage across the first condenser being fed into the cathode follower, a second condenser of greater value than said first, a second diode connecting said cathode follower output to said second condenser, said second diode and condenser forming a second rectifier-condenser pair, voltage input to the second rectifier-condenser pair being connected across the second rectifier and condenser in series, output voltage being taken across said second condenser, an output terminal for delivering the input signal peak as a steady voltage, a voltage regulator tube connecting said second condenser to said output terminal, a source of negative voltage, and a resistor connecting said source to said output terminal, the type of voltage regulator tube and the value of said resistor being selected to exactly balance the amplification factor of said signal amplifier and reproduce the peak amplitude of the signal voltage.

3. A transient peak voltmeter comprising, an input signal amplifier, a first condenser and a first diode forming a first rectifier-condenser pair and connecting the signal amplifier to the first condenser, voltage input to the first rectifier-condenser pair being connected across the rectifier and condenser in series, a duotriode having a common cathode and a pair of grid and anode electrodes, said anodes being directly connected to a positive voltage source, a cathode load resistor connected to said common cathode, said first condenser being connected to one of said grids, voltage output being taken across the first condenser, a gating voltage connected to the other grid to control the conducting period of said duotriode, a second condenser of greater value than said first, a second diode connecting said common cathode to said second condenser, said second diode and condenser forming a second rectifier-condenser pair, voltage input to the second rectifier-condenser pair being connected across the second rectifier and condenser in series, output voltage being taken across said second condenser, an output terminal for delivering the input signal peak as a steady voltage, a voltage regulator tube connecting said second condenser to said output terminal, a source of negative voltage, and a resistor connecting said negative source to said output terminal, the type of voltage regulator tube and the value of said resistor being selected to exactly balance the amplification factor of said signal amplifier and reproduce the peak amplitude of the signal voltage.

References Cited in the file of this patent

UNITED STATES PATENTS

| 2,389,991 | Mayle | Nov. 27, 1945 |
| 2,535,377 | Titterton | Dec. 26, 1950 |
| 2,547,978 | Ryerson | Apr. 10, 1951 |
| 2,624,770 | Yetter | Jan. 6, 1953 |

FOREIGN PATENTS

| 517,486 | Great Britain | Jan. 31, 1940 |

OTHER REFERENCES

"Transient peak voltmeter," by Ryerson and Aronson, Electronics, September 1945, pages 110 and 111 relied on.

Proceedings of the I. R. E., vol. 35, No. 2, February 1947, pages 208–211.